Dec. 15, 1970  H. F. HECK  3,546,738
APPARATUS FOR DRESSING FISH
Original Filed Feb. 23, 1967  5 Sheets-Sheet 1
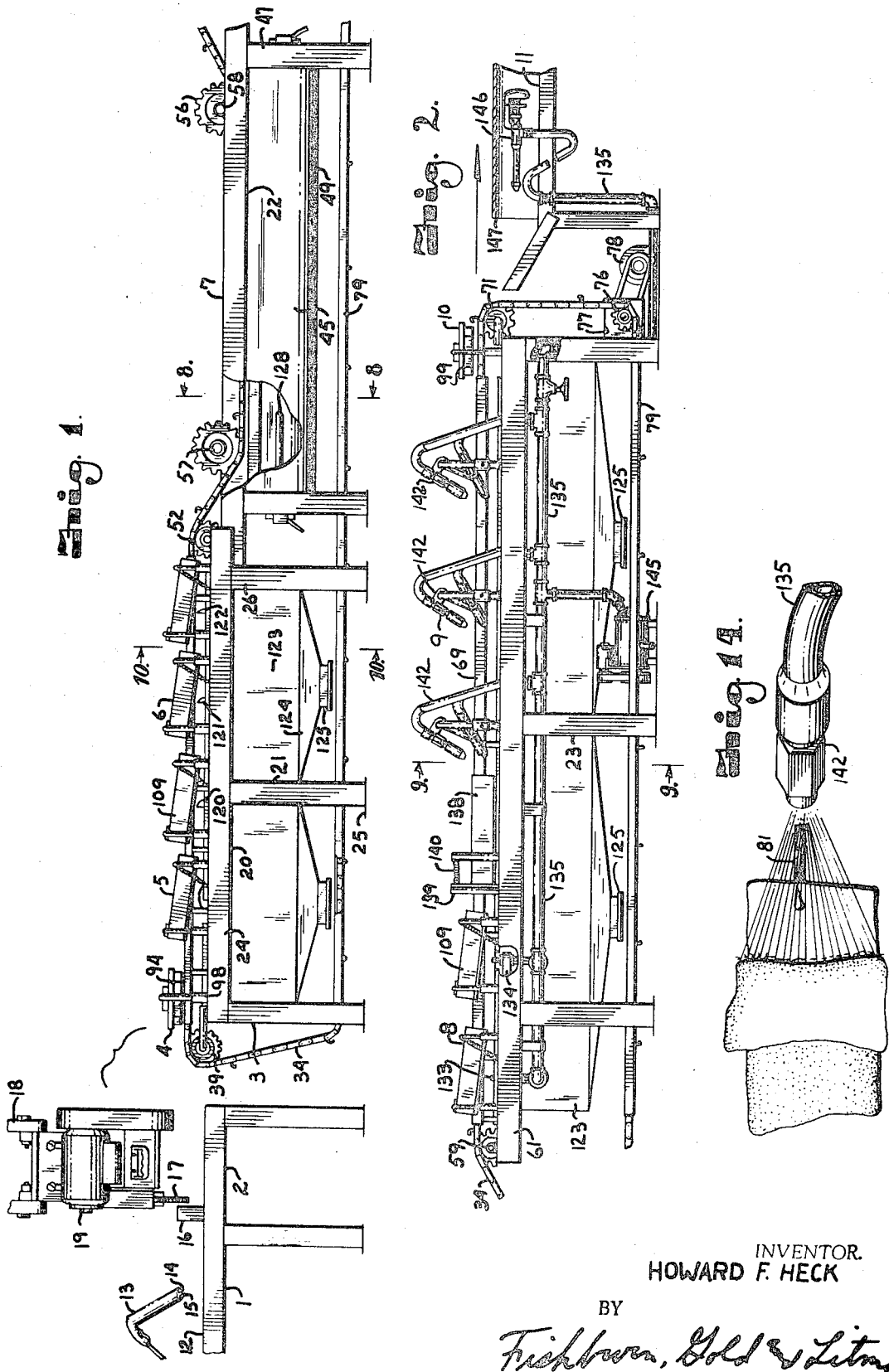
INVENTOR.
HOWARD F. HECK
BY
Fichtner, Gold & Litman
ATTORNEYS Dec. 15, 1970     H. F. HECK     3,546,738
APPARATUS FOR DRESSING FISH
Original Filed Feb. 23, 1967     5 Sheets-Sheet 2
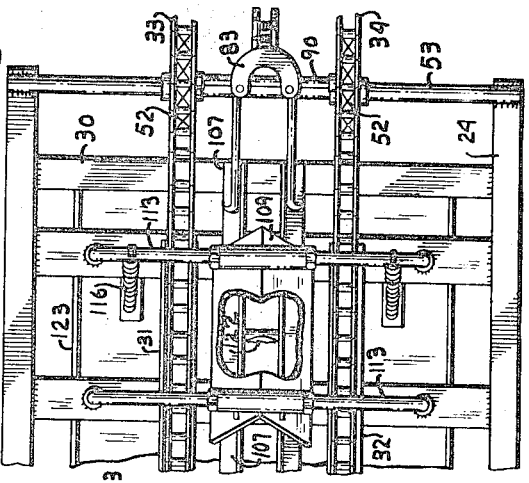
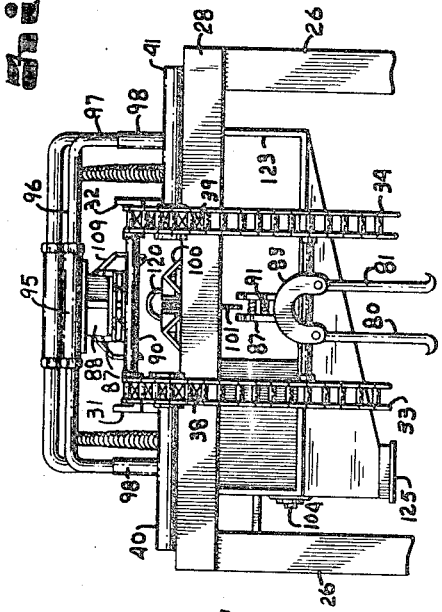
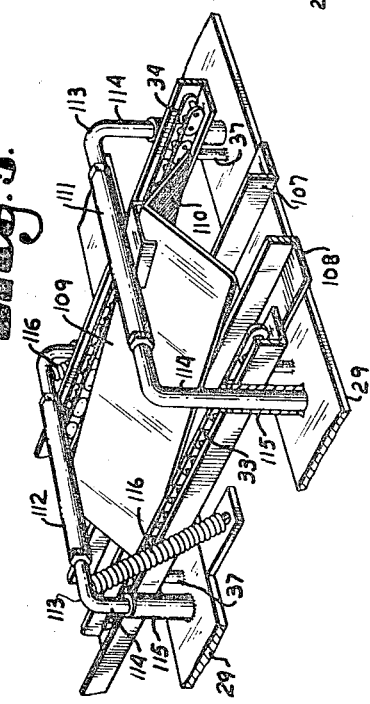
INVENTOR.
HOWARD F. HECK
BY
ATTORNEYS Dec. 15, 1970  H. F. HECK  3,546,738
APPARATUS FOR DRESSING FISH
Original Filed Feb. 23, 1967  5 Sheets-Sheet 5
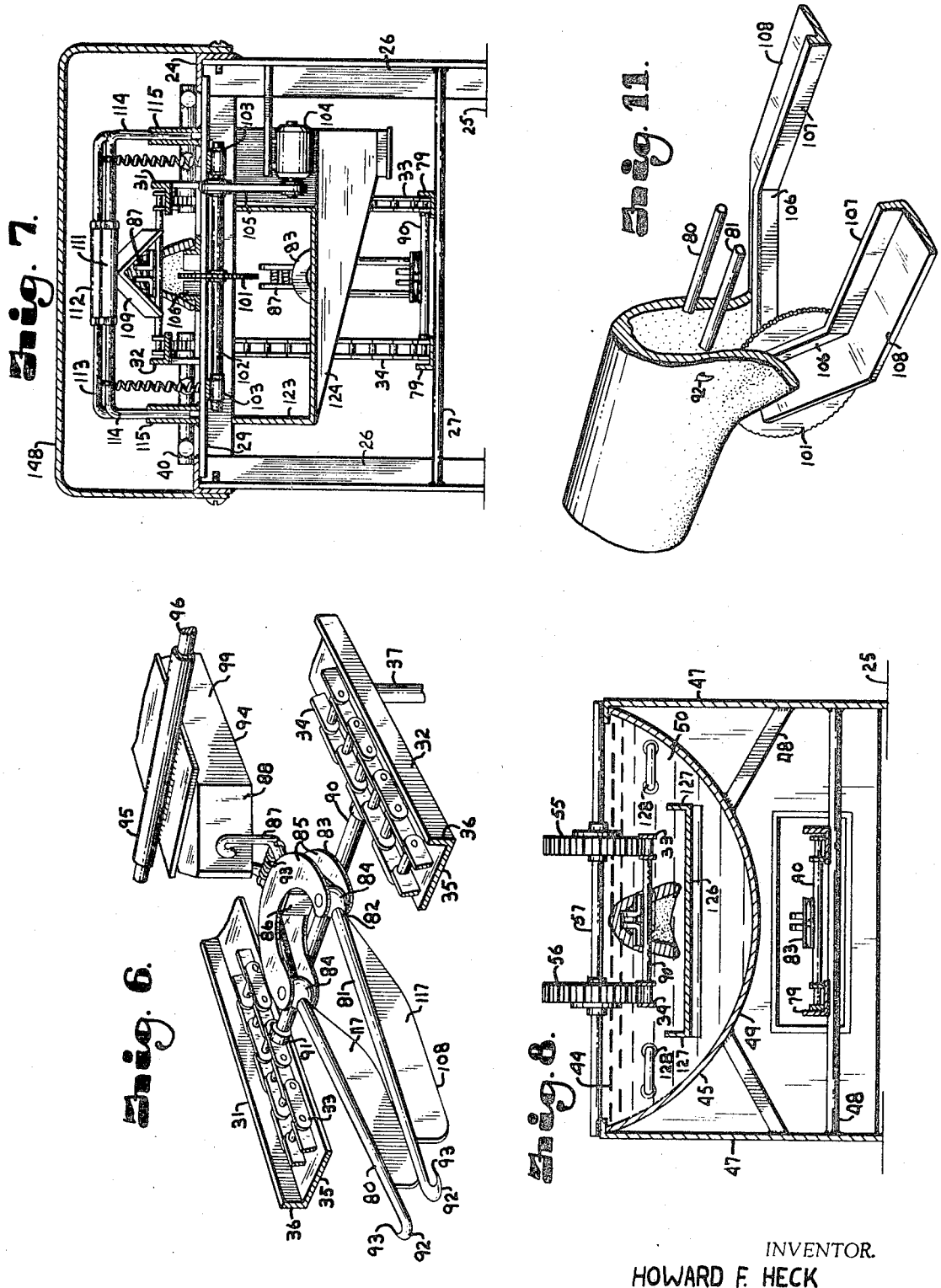
INVENTOR.
HOWARD F. HECK
BY
Fishburn, Gold and Litman
ATTORNEYS Dec. 15, 1970     H. F. HECK     3,546,738
APPARATUS FOR DRESSING FISH
Original Filed Feb. 23, 1967     5 Sheets-Sheet 4
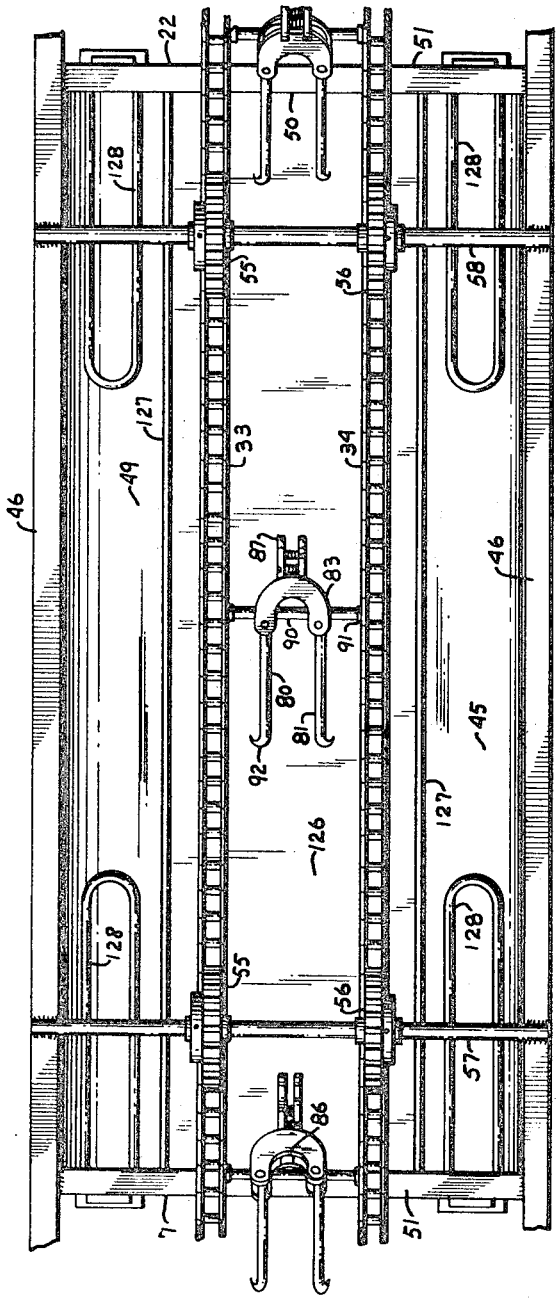
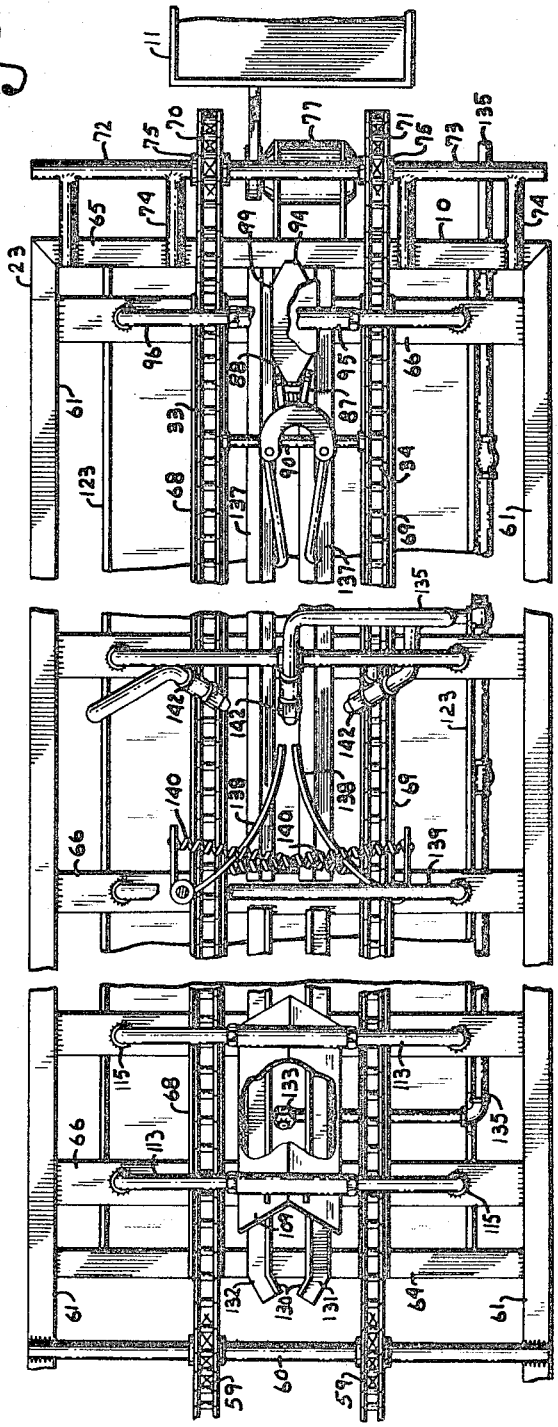
INVENTOR.
HOWARD F. HECK
BY
ATTORNEYS Dec. 15, 1970        H. F. HECK        3,546,738

APPARATUS FOR DRESSING FISH

Original Filed Feb. 23, 1967        5 Sheets-Sheet 5

INVENTOR.
HOWARD F. HECK
BY
ATTORNEYS

United States Patent Office 3,546,738
Patented Dec. 15, 1970

3,546,738
APPARATUS FOR DRESSING FISH
Howard F. Heck, 107 W. 7th St.,
Lawrence, Kans. 66044
Original application Feb. 23, 1967, Ser. No. 618,017, now Patent No. 3,453,684, dated July 8, 1969. Divided and this application Dec. 9, 1968, Ser. No. 782,236
Int. Cl. A22c 25/14, 25/17
U.S. Cl. 17—62       10 Claims

ABSTRACT OF THE DISCLOSURE

An apparatus for dressing fish wherein a fish is killed and the head portion removed from the body and then the body moved through the apparatus for dressing, the apparatus having a conveyor with connectors and operating structure for retracting and then engaging the connectors with the fish body to move same through the defined path, the apparatus including a slitting means to slit the belly of the fish longitudinally thereof. Spreader means along the path engage the sides of the belly to spread same and expose the interior of the body while members extend into the interior as the body is moved thereunder to remove the entrails therefrom. A heated liquid bath is in the path for immersion of the body for heating the skin only, the fish body passing out of the bath and moved along the path where the apparatus includes high pressure flat liquid spray nozzles for directing streams into the interior and also onto the outer surfaces to remove skin layers leaving only the innerdermis on the body, the fish body then being delivered to an inspection table.

This application is a divisional application of applicant's prior copending application, Ser. No. 618,017, filed Feb. 23, 1967, now United States Pat. No. 3,453,684 granted July 8, 1969.

The principal objects of the present invention are to provide an apparatus for cleaning and dressing fish wherein the fish are killed, beheaded, the belly split, the entrails removed and then the outer layers of skin removed from the body leaving the fatty innerdermis covering the surface of the body for protection of the flesh thereof during the process of freezing, merchandising, final washing preparation for cooking with said innerdermis disintegrating upon contact with cooking heat; to provide an apparatus wherein the apparatus includes a conveying mechanism and elements to engage the forward portion of the fish body and move it through a path where the body is substantially vertical; to provide such an apparatus with support structures and holddown devices along the path to move the body over a cutter for slitting the belly portion of the body longitudinally opening the body, spreading the belly portions and moving over members to enter the interior and remove the entrails; to provide such an apparatus with a heated liquid bath in which the body is immersed for a period to heat only the skin and then upon removal of the body from the bath, high pressure fluid jets are directed onto the body surfaces to remove the outer layers of skin, leaving only the fatty innerdermis for protection of the flesh during further processing; and to provide an apparatus for cleaning and dressing fish that is humane in the killing, economical to operate and highly efficient in dressing the fish to provide a fish body having a thin film of innerdermis to protect the flesh of the body.

Other objects and advantages of this invention will become apparent from the following description, taken in connection with the accompanying drawings, wherein are set forth by way of illustration and example certain embodiments of this invention.

FIG. 1 is a side elevation of a portion of the apparatus including the killing, beheading stations and the conveying and processing portions including the slitting, entrail removing and heat bath portions thereof, with covers removed.

FIG. 2 is a side elevation of the conveying and processing apparatus following the portion shown in FIG. 1 and including the skin removal, discharge and inspection stations, with covers removed.

FIG. 3 is an enlarged plan view of the conveying and processing apparatus of the slitting and entrail removing portions, with covers removed.

FIG. 4 is an end elevation of the conveying and processing apparatus at the carcass introducing end.

FIG. 5 is a detailed perspective view of a portion of the processing path illustrating the body supports and holddowns.

FIG. 6 is a detailed perspective view of the conveyor and body engaging portions and operating member therefor at the carcass introducing end of the apparatus.

FIG. 7 is a transverse sectional view through the apparatus taken on the line 7—7 of FIG. 3.

FIG. 8 is a transverse sectional view through the apparatus and the liquid bath station, taken on the line 8—8 of FIG. 1.

FIG. 9 is a transverse sectional view through the apparatus taken on the line 9—9, FIG. 1.

FIG. 10 is a transverse sectional view through the apparatus taken on the line 10—10, FIG. 1.

FIG. 11 is a fragmentary detail perspective view of the slit body spreading members.

FIG. 12 is a plan view of the apparatus at the liquid bath portion.

FIG. 13 is a plan view of the apparatus showing the skin removing section and discharge section and the relative positioning of the jet nozzles.

FIG. 14 is a detail perspective showing a nozzle and jet therefrom contacting the body to remove the outer layers of skin therefrom.

FIG. 15 is a detail perspective view of one of the entrail removing scoops.

Referring more in detail to the drawings:

The apparatus contemplated by this invention includes a killing station 1, a head removal station 2 and a conveying and processing apparatus 3 which includes a body introducing or feeding station 4, a slitting station 5, an entrail removing station 6, a heated bath portion 7, a portion 8 for removal of the skin from the interior of the body, a portion 9 for removal of skin portions from the exterior of the body, a discharge portion 10, and an inspection station 11.

Fresh fish are delivered to the killing station 1, as, for example, on a table surface 12, where an electric device 13 with spaced terminals 14 and 15 is used for killing the fish. The electrical device or instrument 13 uses a suitable electric current which may vary, however, it is preferred to use a 12 volt D.C. current, for convenience and safety of the operator. The fish is killed by applying the electric current to the head thereof by touching same with the terminals 14 and 15 and this tends to move the blood to the head. The fish then is placed on a block 16 with the head extending therefrom and a cutter 17 rotatably mounted on a swinging frame 18 and driven by a motor 19 is moved transversely of the fish to cut the head from the body of the carcass.

The operator feeds the beheaded body into the conveying and processing apparatus 3 where the body is moved through a processing path, the belly slit, entrails removed, heat applied to the skin, the outer and intermediate layers of the skin removed from the body leaving the fatty innerdermis as a protective covering to the fish flesh of the body discharged from the end of the apparatus onto an inspection table 11, where an operator inspects the body to be sure that it is in proper condition and to remove any outer portions of skin that might be left thereon. The cleaned or dressed fish carcass or body is then ready for further processing, as, for example, freezing and packaging. The fatty innerdermis on the body protects the fish flesh during such freezing and packaging as well as during the shipping, merchandising, and final wash preparations for cooking, said interdermis disintegrating upon contact with cooking heat.

The conveying and processing structure includes a frame 20, which may extend from the starting portion 4 to the inspection station or table 11 or may be arranged in connected sections, as, for example, a section 21 for the slitting and entrail removal portion, a frame 22 for the liquid bath portion and a frame 23 for the skin removal portion. Each of said portions have longitudinally extending side rails, as, for example, in section 21 there are side rails 24 supported above a floor or other supporting surface 25 by posts 26 longitudinally spaced along the frame. The posts 26 are preferably arranged in pairs with the posts of each pair being laterally spaced and substantially under the respective laterally spaced side rails 24. It is preferred that the posts of each pair be connected by trasverse lower members 27 to maintain the spacing and add rigidity to the frame. There are also a plurality of transverse members connecting the side rails or members 24 wherein the frame is a rigid structure. One such transverse member is a cross member 28 connecting the ends of the side members 24 at the feeding end of the apparatus.

In the slitting and entrail removing section there are a plurality of longitudinally spaced transverse members 29 having ends fixed to the side rails 24 and cooperating with the end member 28 and a member 30 adjacent the other end of the section in supporting laterally spaced longitudinally extending guide rails or ways 31 and 32, which provide support for the upper run of continuous flexible conveyor members or chains 33 and 34, respectively. The ways 31 and 32 are parallel and extend longitudinally of the path along which a fish body is moved. In the illustrated structure the ways are angle-shaped in cross section and include a substantially horizontal leg 35 on which the respective chain run moves and an upstanding leg or portion 36 positioned adjacent to and outwardly of the respective chain run whereby said upstanding legs limit or prevent lateral movement of the chain runs. The ways 31 and 32 are supported in upwardly spaced relation to the cross members 28, 29 and 30 by means of supports such as posts 37 so the chain runs move at a desired elevation above fish body support structure also carried on the cross members as later described.

The conveyor members 33 and 34 operate over suitable wheels or sprockets 38 and 39, respectively rotatably mounted on shafts 40 and 41, which are carried on arms 42 mounted on the frame whereby the shafts and sprockets carried thereby are spaced outwardly from the transverse member 28. The shafts 40 and 41 have suitable collars 43, or the like, to prevent lateral movement of the sprockets or wheels. The level of the chain or conveyor runs changes at the end of the entrail removal portion to a lower level whereby they move below the level 44 of liquid in a tank 45 supported by the frame section 22. This frame section also has side members or rails 46 supported by posts 47 with suitable transverse members 48 forming a rigid frame for support of the tank member 45.

The tank 45 is illustrated as having a bottom 49 arcuate in shape with the side edges secured to the side rails 46. The tank has end walls 50 which are secured to upper end frame members 51, said tank being of suitable size whereby fish bodies may be immersed into the liquid with the length being such relative to the speed of the conveying mechanism for the proper heating of the fish body skin as later described. The change of direction of the chain or conveyor members 33 and 34 is effected by means of sprockets 52 rotatably mounted on a shaft 53 fixed to the side rails 24 adjacent to and spaced from the cross member 30. The conveyor members 33 and 34 then move under sprockets or wheels 55 and 56 rotatably mounted on shafts 57 and 58, respectively, having end portions fixed to the side rails 46 with the shafts 57 and 58 spaced longitudinally of the path and tank whereby the run of the conveyor members 33 and 34 between said sprockets is immersed in the liquid in the tank.

From the tank 45, the direction of the conveyor runs is then elevated, the chains running over sprockets or wheels 59 rotatably mounted on shaft 60 having its ends fixed to side rails 61 of the frame section 23. The sprockets 59 and the shaft 60 being located at the end of the frame section adjacent the liquid bath section. The frame section 23 has structure similar to frame section 21, the upper side rails being supported by plurality of spaced posts 62 suitably connected by lower transverse members 63 and having transverse members 64 and 65 adjacent the respective end portions of the section connecting the upper side rails 61. The frame section 23 also has a plurality of transverse or cross members 66 spaced between the members 64 and 65 from which upwardly extending posts or members 67 support conveyor guide ways 68 and 69 in the same manner as the guide ways 31 and 32 are supported, on the frame section 21. The guide ways 68 and 69 also are of angle cross-section and arranged in the same manner as the ways 31 and 32. At the discharge end 10 the conveyor members or chains 33 and 34 run over spaced wheels or sprockets 70 and 71 rotatably mounted on shafts 72 and 73 that are supported in spaced relation to the cross member 65 by means of arms 74. Suitable collars 75 are mounted on the shafts 72 and 73 to retain the sprockets or wheels 70 and 71 in proper position in the line of the respective conveyor chains.

The conveyor chains 33 and 34 extend downwardly from the sprockets or wheels 70 and 71 and are operatively engaged with drive wheels or sprockets 76 driven through a speed reducer 77 by a motor 78 to effect proper movement and speed of the conveyor chains. The lower run of the chains extends from the drive wheels 76 over support members 79 to adjacent the feed end of the apparatus where they extend to the sprockets or wheels 38 and 39.

The conveyor structure has a plurality of fish connecting means spaced therealong whereby a fish body or carcass is engaged adjacent the end from which the head was severed to move and hold the fish as the conveyor structure moves same along the processing path. While various types of grippers may be utilized, in the structure illustrated the connecting means has two elongate fingers 80 and 81 having portions 82 pivotally mounted on holders 83 as by trunnions 84. The holder 83 has spaced substantially U-shaped members 85 rigidly connected as at 86 which leaves space therebetween for control arms 87 that extend from the fingers 80 and 81 forwardly of the holder and terminate in upwardly extending actuating members or posts adapted to engage cam means 88 for moving the fingers 80 and 81. The holder 83 of each connector is mounted on a respective shaft 90 in fixed relation thereto with the ends of said shaft mounted in bearing members 91 engaged in opposed relation on certain links of the conveyor chains 33 and 34. The free ends of the fingers 80 and 81 are preferably provided with outwardly turned ends 92 that are sharpened to form hook members 93 to engage the fish carcass. The outer ends of the fingers 80 and 81 are urged outwardly to a limit provided by engagement of the arms 87 with the connector or abutment 86 by means of resilient members such as springs 93 positioned between the arms 87 to thereby urge same toward each other.

Throughout the travel of the conveyor, the fish connector fingers 80 and 81 are normally in their spread or outermost position in which they hold the fish carcass.

At the feeding end and discharge end cam members 88 are arranged to automatically cause the free ends of the fingers to be moved substantially together to facilitate placing a fish on the hooks 92 and to discharge the fish at the discharge end. Each of said cam portions are in the form of a block 94 supported on a respective bracket 95 which is carried in a centered location above the upper conveyor runs by means of a support in the form of a U-shaped rod 96, the legs 97 of which are mounted in socket members 98 carried by a cross member 29 adjacent the feed end of the slitting section. The other cam means is centrally mounted with the legs of the support positioned in the socket members of a cross member 66 adjacent the discharge end of the skin removing section. The respective blocks 94 are so arranged that their under surfaces will clear the carcass connected to the fingers 80 and 81, but the post portions of the arms 87 extend upwardly and engage diverging faces 99 to spread the members 87 as the conveyor moves the connector members toward said block. This causes the fingers 80 and 81 to be moved together at their outer ends whereby the operator can extend the head end of the carcass over the hooks 92 so as to engage the carcass therewith when the members 87 ride beyond the block and the spring 93 causes the fingers to spread. The engagement with the carcass is such that the belly thereof is down and the longitudinal central plane through the carcass is substantially vertical. The operation of the cam and fish connector at the discharge end is substantially the same, engagement of the members 87 with the cam surfaces bringing the fingers together, whereby the cleaned carcass is removable therefrom.

Carcass guides or ways 100 are mounted on the slitting section extending from the feeding end thereof substantially to a cutter 101. The ways 100 are below the ways 31 and 32 for the upper run of the conveyor chains and in the illustrated structure they are in the form of inverted V-shaped members laterally spaced and fixed on the transverse or cross members 28 and 29. The relative height of the conveyor ways 31 and 32 to the ways 100 is such that the adjacent walls of the ways 100 will engage the sides of the belly of the fish carcass as it is moved by the conveyor.

The slitter or cutter 101 is preferably in the form of a rotary knife or saw mounted on a shaft 102 supported in bearings 103 carried by suitable cross members 29, said shaft 102 being driven by a motor 104 through a suitable power transmission means such as belts and pulleys 105. Alongside of the slitter knife are divering spreader members 106 to spread the belly portions of the slit carcass as it is moved thereover, said spreader portion 106 merging into parallel spreading rails 107 which extend therefrom through the entrail removing portion of the apparatus. In the structure illustrated, the spreader portions 106 and rails 107 are upstanding flanges of angle members, the other flange 108 of which is suitably secured to and supported by the cross members 29. The flanges 108 extend outwardly from the rails 107 so as to provide an opening for access to the interior of the carcass.

In the slitting of the carcass and other processing, it is desirable to hold the carcass downwardly relative to operating portions. Suitable holddown members 109 are arranged along the path of the carcass and each preferably consists of inverted V-shaped elongate members presenting underneath surfaces 110 adapted to slidably engage the upper portion or back of the carcass. The members 109 are provided with transverse sleeves 111 and 112 adjacent the respective ends thereof, with each of said sleeves having support members 113 extending laterally outwardly and downwardly therefrom providing legs 114 that are slidably mounted in upstanding socket members 115 on adjacent transverse members 29. This permits the holddown members to move up and down and they are urged downwardly by means of resilient members such as springs 116 connected to the support members 113 of the sleeve 112 and to a suitable portion of the frame. In the structure illustrated, the end portions of the holddown having te sleeve 111 is preferably toward the approaching carcass and is limited in its downward travel whereby the carcass may always enter under that end of the holddown, the other end being resiliently urged downwardly and capable of greater downward travel so as to provide pressure on the carcass moving thereunder and assure that it will be held down during the slitting operation and other operations that follow.

In order to prevent the slitter from cutting through the tail portion, the fingers 80 and 81 each have a depending skid 117 that extends from adjacent the holder and terminates short of but near the hook portions 92, said skids each having lower edges 118 of proper contour whereby as they engage a laterally extending bar 119 adjacent but downpath from the slitter knife, they cause the carcass to move upwardly as the slitter approaches the tail end of the belly wtih the fish then being supported so the tail rides over the slitter and is not cut.

Subsequent to the slitting, the fish carcass is moved over entrail removing members arranged in stages to assure removing same. As the carcass moves from the slitter, the sides of the belly portion are held in spread relation by the spreader rails 106 under a series of holddown members corresponding to the holddown 109 and operating in the same manner to hold the carcass as it moves over a series of spoon-like scoops 120, 121 and 122. These scoops vary slightly in structure, the first one 120 being particularly arranged to remove the air bladder. Scoop 121 removes substantially all of the entrails and the scoop 122 removes the liver. Mounted in the frame under the slitter and entrail removing sections there is a collector 123 formed of sheet metal to substantially enclose the lower portion of the apparatus. The collector 123 has a bottom 124 which slopes to a discharge chute 125 to assure movement of the waste portions such as the entrails and drippings from the slitter to a disposal such as a grinder (not shown).

After the carcass is moved through the entrail removing section, it is then moved by the conveyor members into the tank 45 wherein it is immersed in the liquid which may be water or suitable solutions of salt water or the like. Mounted in the tank in a horizontal longitudinally extending pan member 126 in the form of a floor with upstanding side edges 127. This floor provides a support for any fingers on which a fish is not mounted and also permits the fish carcass to ride therealong as it is moved through the liquid bath. The tank is provided with a plurality of suitable immersion heaters or the like 128 wtih suitable controls to maintain the liquid at a temperature of 150° to 170° F. and preferably near the mean temperature of 160° with the length of the immersion of the carcass being such that the skin only is heated to the 160° F. so as to avoid penetration of heat into the fish flesh. The carcass is moved through the heated liquid bath and is then moved up to the skinning section.

The skinning section at the entry end thereof has spreaders in the form of divering rails 130 which engage and again spread the sides of the belly portion of the carcass to open same, the rail portions 130 having parallel extensions 131 to retain the belly portions spread for a first skinning operation. Rails 130 and 131 are similar in form to the rails 105 and 106 and are mounted in a similar manner in that they are angular in cross section and have lower flanges 132 extending outwardly and secured to the cross members 64 and 65. Also holddowns 109 are positioned above the rails to engage the fish carcass and hold same downwardly thereon. Mounted in the frame below the rails 130 and 131 are nozzles 133 and 134 spaced longitudinally of the processing path and suitably connected by conduits 135 to a source of high pressure fluid. The spray nozzles 133 and 134 are arranged to direct fan-shaped flat high pressure sprays with the plane thereof substantially transversely of the path of travel of the carcass, said sprays being directed upwardly between the rails 131 and into the interior of the fish carcass to remove the outermost layers of skin therefrom. It is preferred to have the sprays arranged in a series or stages to assure removal of the outer skin. Also, it is preferred that the spray be directed at a slight angle to the vertical and toward the approaching carcass, the angle of the spray being such that it is preferably approximately 80° from the surface on which the spray impinges. It is preferred to operate such sprays at a pressure of 600 to 800 pounds per square inch, so that the thin flat sprays are knife-like and peel the skin from the carcass but leave the fatty innerdermis or layer to protect the flesh.

After the fish has passed the portion of the apparatus for removing the skin from the interior of the carcass, it then moves over inverted V-shaped rails or ways 137 laterally spaced and mounted on the cross members 66 whereby the side portions of the belly will be spread and rest thereon. As the fish carcass approaches said rails it passes between pivotally mounted baffles 138 carried on supports 139 which are arranged with resilient members 140 tending to close the baffles after the carcass passes thereby, said baffles acting as a partial shield to deflect skin portions outwardly as such portions may be removed from the exterior of the carcass. The carcass is moved along the rails 137 and under batteries of spray nozzles 142. In the illustrated structure, there are three nozzles in each battery, one being directed downwardly on the upper surface of the carcass and the others directed inwardly from the sides against the side surfaces. It is preferred to have a series of such batteries, as, for example, in the illustrated structure there are three stages to assure removal of the outer and intermediate skin layers from the exterior of the carcass. Each of the nozzles in the batteries 142 are arranged to deliver flat fan-shaped high pressure sprays which abrade or peel the outer layers of the skin from the carcass. The spray nozzles 142 are each suitably connected to the conduit 135 for receiving the high pressure fluid from a pump or other suitable source 145.

As the carcass moves from the skinning portion, the cam member operates the holding fingers 80 and 81 to release the carcass for delivery to the inspection table 11. There the carcass is inspected and if any skin portions are to be removed, a hand spray 146 is utilized to direct the spray on the particular portion and remove the skin therefrom. It is preferred that the inspection table have a hood 147 arranged thereover to permit suitable inspection and necessary finish cleaning, whereby only suitable and properly dressed carcasses with the flesh protected by the innerdermis that is left thereon is then passed from the inspection table to a further processing such as freezing and packaging. Portions of the apparatus contacting the carcass are preferably of suitable metals such as stainless steel or the like or a metal suitably processed to be used in contact with edible foods. Also, a suitable covering or housing 148 is arranged over substantially all of the apparatus 3 for the conveying and skinning of the fish carcass, said covering preferably being in sections for easy removal.

The particular apparatus illustrated is exemplary only and is believed obvious that with the method disclosed fish may be easily and humanely killed, process for thorough cleaning and dressing and particularly to provide a carcass that is dressed and substantially ready for cooking with the flesh protected prior thereto by the fatty innerdermis that remains thereon.

It is to be understood that while I have illustrated and described certain forms of my invention, it is not to be limited to the specific forms or arrangement of parts herein described and shown except insofar as such limitations are included in the claims.

What I claim and desire to secure by Letters Patent is:

1. A fresh fish cleaning and dressing apparatus comprising,
   (a) a fish belly slitting means,
   (b) a belly spreading means,
   (c) an entrail remover,
   (d) a heated liquid bath,
   (e) a high pressure jet means for directing flat fan shaped liquid streams against the interior and exterior of the fish body for removing the outer skin portions and leaving the innerdermis layer covering the flesh portions of the fish body,
   (f) and a conveyor means moving a fish body to subject same first to the slitting means to open the belly then to the spreading means, entrail remover, liquid bath and jet means in sequence.

2. A fresh fish cleaning and dressing apparatus as set forth in claim 1, wherein the liquid bath has a temperature of 150° to 170° F. and the conveyor means moves at a rate relative to the bath wherein the fish body is exposed to the bath for a period of from 15 to 30 seconds whereby the liquid bath imparts said heat to the fish body skin only.

3. A fresh fish cleaning and dressing apparatus as set forth in claim 1 wherein the pressure of the high pressure jet means is six hundred to eight hundred pounds per square inch.

4. A fresh fish cleaning and dressing apparatus as set forth in claim 1 wherein the fan shaped liquid streams are directed against the fish body at an angle of approximately 80° from the surface on which the spray impinges.

5. A fresh fish cleaning and dressing apparatus comprising,
   (a) cutter means operable to transversely cut the carcass to remove the head from the body of a fish to be cleaned,
   (b) an endless conveyor having a run along a processing path,
   (c) means spaced along the conveyor and engageable with portions of the body for connecting the body to the conveyor for movement therewith with the central longitudinal plane of the body substantially vertical,
   (d) second cutter means in said path and operable to slit the fish belly longitudinally as the conveyor moves same thereover,
   (e) laterally spaced guide means along said path for supporting the fish body as it is moved along said path,
   (f) means spaced along said processing path for holding the fish body engaged with said guide means,
   (g) a plurality of cleaning means spaced along said processing path for movement into the body interior and longitudinally thereof for removing entrails as the body is moved thereover by the conveyor,
   (h) an elongate tank means containing a liquid bath located in the process path following the entrail removing,
   (i) means cooperating with said conveyor for immersing the fish body in the liquid in said tank and moving same therethrough,
   (j) means heating said bath with the temperature and the time of exposure of the body to the bath effecting heating of only the fish body skin to a temperature of from 150° F. to 170° F.,
   (k) a plurality of nozzles spaced along the process path beyond said tank and connected with a liquid pressure supply and adapted to emit thin high pressure flat jet streams at an angle to the direction of the body movement and against the interior and exterior of said body to strip skin from the body leaving the fatty innerdermis thereon for protecting the fish flesh during subsequent freezing, merchandising and final washing preparations for cooking, said innerdermis disintegrating upon contact with cooking heat.

6. A fresh fish cleaning and dressing apparatus as set forth in claim 5 and including,
   (a) means in the processing path engaging slit portions of the fish belly and opening and spreading same as the body moves from said second cutting means.

7. A fresh fish cleaning and dressing apparatus as set forth in claim 5, and including,
   (a) a frame along which the conveyor run moves,
   (b) cooperating means on the members of the conveyor engaging the fish body and the frame to elevate the fish body upon completion of the slitting of the belly whereby said slit terminates short of the tail portion of the body.

8. A fresh fish cleaning and dressing apparatus as set forth in claim 7, and including,
   (a) cooperating means on the body engaging members and the frame for effecting engagement with the fish body and connect same to the conveyor for movement thereby prior to the slitting,
   (b) cooperating means on said body engaging members and the frame for effecting disengagement of said body following removal of skin portions therefrom.

9. A fresh fish cleaning and dressing apparatus as set forth in claim 5 wherein the liquid pressure supply is six hundred to eight hundred pounds per square inch and the thin flat jet streams are directed against the fish body at an angle of approximately 80° from the surface on which the streams impinge.

10. A fresh fish cleaning and dressing apparatus as set forth in claim 1 and including:
   (a) means supporting the fish body as it is moved by the conveying means during slitting of the belly,
   (b) means cooperating with the conveying means to elevate the fish body upon completion of the slitting of the belly whereby said slit terminates short of the tail portion of the body.

References Cited

UNITED STATES PATENTS

| | | | |
|---|---|---|---|
| 1,819,060 | 8/1931 | Baader | 17—58X |
| 2,020,579 | 11/1935 | Schlothan | 17—62 |
| 2,172,472 | 9/1939 | Grow | 17—64 |
| 2,466,614 | 4/1949 | Rivers | 17—58 |
| 2,536,826 | 1/1951 | Taus | 17—58X |
| 2,993,227 | 7/1961 | Couret | 17—58 |

HUGH R. CHAMBLEE, Primary Examiner

U.S. Cl. X.R.

17—58